Jan. 2, 1934.    E. B. BELL    1,942,044

BRAKE MECHANISM

Filed Nov. 30, 1928

Inventor
Edward B. Bell
by Heard Smith & Tennant.
Attys.

Patented Jan. 2, 1934

1,942,044

UNITED STATES PATENT OFFICE 1,942,044

BRAKE MECHANISM

Edward B. Bell, Lowell, Mass.

Application November 30, 1928
Serial No. 322,674

8 Claims. (Cl. 188—78)

This invention relates to brake mechanisms and more particularly to the type employed in vehicles and has for its general object to provide a brake which will act with a relatively great pressure upon the friction surface with a minimum of energy expended at the point of application of the braking force.

A further object of the invention is to provide a brake having means to bring the brake shoe rapidly into contact with the friction surface with a minimum of motion at the brake actuating means.

A further object of the invention is to provide a brake which will permit a relatively great motion of the brake shoe thereby permitting the use of a thick brake lining and to obtain this end without necessitating undue motion at the brake actuating means.

A further object of the invention is to provide a brake having separate means to move the shoe into engagement with the friction surface and to apply pressure thereto both actuated by the same brake actuating means.

A further object of the invention is to provide a brake having separate means to move the shoe into engagement with the friction surface and to apply pressure thereto in combination with a lock device to hold the former immovable while the latter acts.

These and other objects and features will more fully appear in the following description in connection with the accompanying drawing.

A preferred embodiment is illustrated in the drawing in which.

Figure 1:
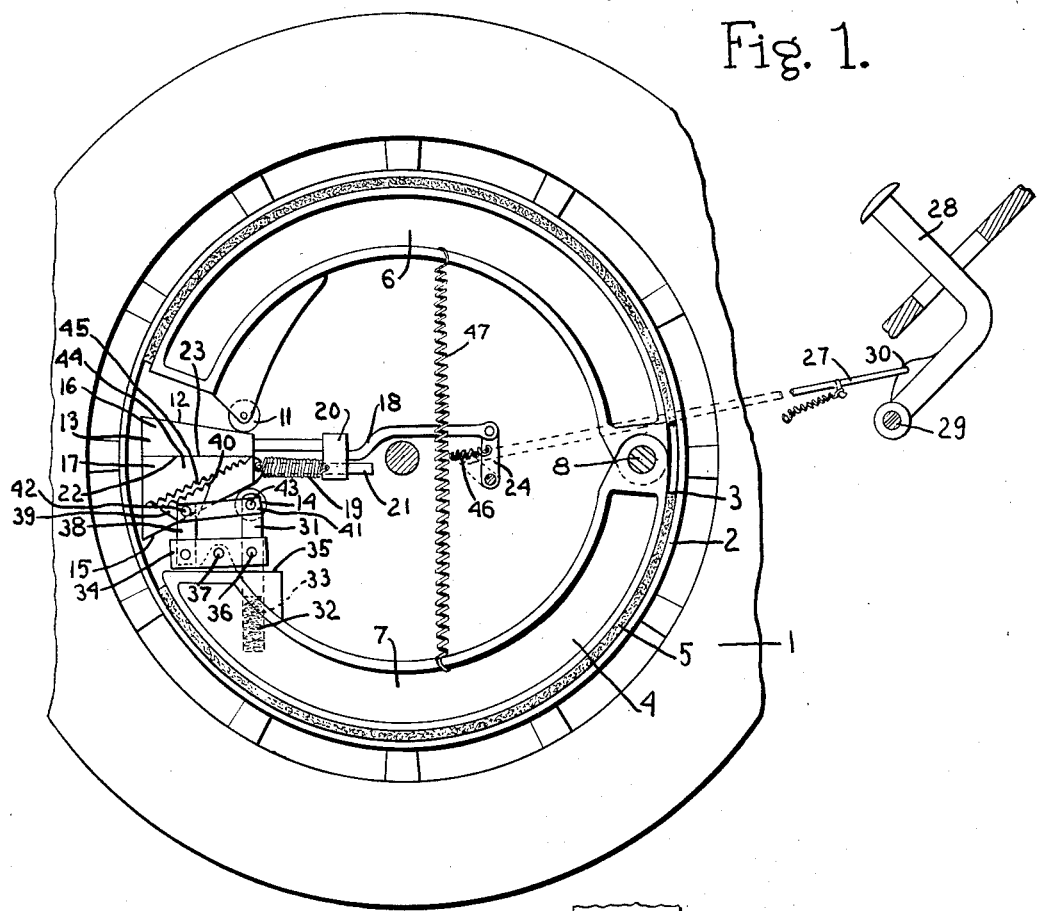
Fig. 1 is a view illustrating the mechanism of the device and showing diagrammatically its adaptation to a motor car.
Figure 2:
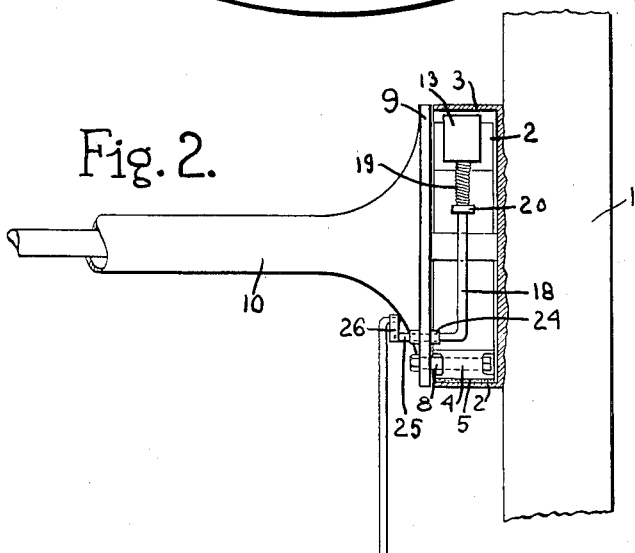
Fig. 2 is a plan view of the motor car wheel with the brake drum broken away.

The device consists in general of a friction surface of any character but for purposes of illustration is herein shown as a drum attached to a wheel of a vehicle. The inner surface of the drum is engaged by the shoe which is itself fixed to some immovable point as the axle housing. The shoe is formed in two sections pivoted together at one end and having followers at their other ends to be engaged by the expanding means. The expanding means may be actuated in any manner but is herein shown as connected to the usual foot pedal. The invention resides chiefly in the structure and operation of the expanding means which will hereinafter be described in detail.

Referring to the brake equipment of a motor car as a common illustration it is desirable that the disengagement of the brake shoe be positive and that the shoe should have an appreciable travel away from its engagement with the friction surface. Furthermore the shoe should have sufficient travel to overcome the effect of wear upon the brake linings. With the common type of mechanical braking mechanism there must be a considerable mechanical advantage between the point of application of the braking force and the means employed to actuate the brake shoe. In order, therefore, to permit the brake shoe to have the proper amount of travel the device at the point of application of the braking force must have a relatively great amount of travel. This latter condition is not practical and is inconsistent with the present requirements of high efficiency and safety in brakes for vehicles. The present invention is designed to overcome this disadvantage and at the same time provide a rugged and powerful brake.

The particular embodiment herein disclosed illustrates a preferred form of the invention. The principles of the invention may however be employed in any manner consistent with the scope of the claims. A brake of the internal expansion type is shown applied to a wheel 1 of a motor car or other vehicle. The wheel 1 is provided with a brake drum 2 rigidly secured thereto and having an internal friction surface 3. Within the drum 2 is situated the brake shoe 4 which is provided with a lining 5. The shoe is made up of two substantially semi-circular members 6 and 7 which are pivoted upon a stud 8 one end of which is fixed rigidly in the flange 9 of the axle housing 10. The free ends of the brake shoe members 6 and 7 are especially constructed to receive the novel actuating means. An anti-friction follower 11 is pivoted to the free end of the element 6 in position to engage the low pitch face 12 of a two-part wedge 13. The free end of the element 7 of the brake shoe is provided with an anti-friction follower 14 having a limited yielding movement. The follower 14 engages the high pitch face 15 of the two-part wedge 13. The wedge 13 is made up of two members 16 and 17. The member 16 having the low pitch face 12 is rigidly connected to a link 18. The other element 17 having the high pitch face 15 is yieldingly connected to the link 18 by means of a tension spring 19. The spring is connected at one end to the member 17 and at its other end to a block 20 rigid with the link 18. An extension 21 of the member 17 passes through the spring 19 and is slidably guided in the block 20. The normal contracted position of the spring 19 holds the front or entering edges of the two members of the wedge in alignment when the brake is inoperative.

As will hereinafter appear the two parts of the wedge 13 have relative motion. In order to permit this relative motion they are provided respectively with faces 22 and 23 which abut and are in a plane substantially parallel to the direction of pull of the brake actuating force. The wedges are prevented from sidewise displacement by the inner wall of the brake drum on one side and the flange 9 of the axle housing 10 upon the other side.

Any suitable means may be employed to actuate the wedge. As herein shown the link 18 is pivotally connected to an arm 24 which is secured to a stud shaft 25 which passes through and has a bearing in the flange 9. Upon the outer end of the stud shaft 25 is secured an arm 26 the outer end of which receives one end of a link 27 reaching forward to the point of application of the braking force. The force may be applied in any way. As herein shown it is applied by the foot upon a brake pedal 28 pivoted upon a shaft 29 fixed to the body of the car. The link 27 is pivotally connected to the pedal 28 near the shaft 29 as at 30. By actuating the pedal the link 27 causes the stud shaft 25 carrying the arms 24 and 26 to rock about its center. The wedge is thus drawn forwardly by means of the pivotal connection between the arm 24 and the link 18.

The follower 14 is mounted in one end of a plunger 31 the other end of which projects into a recess 32 in the member 7 of the shoe 4. The recess 32 is made of sufficient depth to receive a spring 33 below the end of the plunger 31. The spring 33 exerts a pressure upon the plunger 31 which normally is resisted by engagement of a lever 34 with the flat face 35 of the brake shoe member 7. The lever 34 is pivoted at one end to the plunger 31 at 36 and is fulcrumed on the member 7 at 37. The other end of the lever 34 has pivoted thereto a link 38 which extends at substantially right angles to the lever 34 and has fixed to its upper end a locking shoe 39 having a serrated edge 40.

The locking shoe 39 is held from lateral movement by means of a link 41 which is pivoted upon the link 38 at its upper end at 42. The link 41 is parallel to the lever 34 and is pivoted at its other end upon the plunger 31 at 43. The plunger 31 may have a loose fit in its recess 32 so that the plunger, the lever 34, the links 38 and 41 are free to move about the fulcrum 37 as a four bar linkage. The member 17 of the wedge 13 is provided with a locking strip 44 fixed rigidly thereto and having a serrated edge 45 complementary to and adjacent the serrated edge 40 of the shoe 39. The two serrated edges are normally situated just such distance apart as to engage when the plunger 31 is depressed against the action of the spring 33 to the limit of its movement. Such movement is determined by engagement of the shoe 39 and locking strip 44. All force is then transmitted through fulcrum 37.

The operation of the wedge 13 to effect the braking action is as follows. The initial movement of the pedal upon actuation thereof acts through the links 27 and 28 to draw the wedge forward causing the faces 12 and 15 to engage the followers 11 and 14 which expands the two members 6 and 7 of the brake shoe 4 until they engage the friction surface 3. Upon continued application of force upon the pedal a pressure will be built up upon the follower 14 until the pressure of the spring 33 is overcome at which time the follower 14 will yield until the shoe 39 engages the locking strip 44. This yielding movement will cause the lever 34 to rock about its fulcrum 37 and move the locking shoe 39 into engagement with the locking strip 44. The member 17 of the wedge is thus locked against further movement and upon continued application of force upon the pedal the spring 19 will yield and since the member 16 of the wedge is rigid with the link 18 it will continue its forward movement as the pedal is depressed.

The low pitch face 12 of the member 16 then becomes the sole actuating means and exerts a high pressure upon the brake shoe members due to its relatively great mechanical advantage. Any suitable means may be employed to release the brake. As herein shown a spring 46 is fixed at one end to the axle housing and at its other end is fixed the arm 24 upon the stud shaft 25 which acts to restore the wedge to normal position upon release of the pedal 28. The spring 33 will then act to release the locking shoe 39 from the rack 44. It is desirable that some means be provided to positively move the brake shoe members 6 and 7 away from the friction surface. One preferable means of doing this is by securing a tension spring 47 at one end to the member 6 and at its other end to the member 7. The force of the spring 47 must be less than that required to compress the spring 33.

Having thus described the invention, what is claimed as new, and desired to be secured by Letters Patent, is:

1. Braking apparatus comprising a moving element having a friction surface thereon, a stationary element, a shoe connected to the stationary element and adapted to engage the friction surface to retard the moving element, and wedging means acting upon the shoe to give it a relatively rapid motion at small mechanical advantage until it engages the friction surface means actuated by the resistance offered by such engagement to change the mechanical advantage of said weighing means as it continues to act on the shoe thereafter.

2. Braking apparatus comprising a moving element having a friction surface thereon, a stationary element, a shoe connected to the stationary element and adapted to engage the friction surface to retard the moving element, a relatively high pitch wedge acting upon the shoe to give it a rapid motion until it engages the friction surface, automatic means then acting to lock said wedge against movement, and a relatively low pitch wedge acting thereafter to exert pressure upon the shoe and thereby to create friction between the shoe and the friction surface.

3. Braking apparatus comprising a moving element having a friction surface, a stationary element, a shoe connected to the stationary element and adapted to engage the friction surface, a high pitch wedge acting to move the shoe into engagement with the friction surface, means actuated by a predetermined force upon the wedge to lock it against movement after such engagement, and a low pitch wedge actuated by a force greater than said predetermined force to exert a high pressure upon the shoe thereby to create friction between the shoe and the friction surface.

4. Braking apparatus comprising a moving element having a friction surface, a stationary element, a shoe connected to the stationary element and adapted to engage the friction surface, a two-element wedge acting to move the shoe into engagement with the friction surface, one element thereof having a high pitch and the other element having a low pitch, actuating means connected rigidly to said low pitch element and resiliently connected to said high pitch element, and means associated with the actuating means and actuated by a predetermined force to lock said high pitch element against further movement after the shoe has engaged the friction surface, whereby upon application of a force upon the actuating means in excess of said predetermined force said low pitch element will be moved to exert a high pressure between said shoe and said friction surface.

5. Braking apparatus comprising a moving element having a friction surface, a stationary element, a shoe connected to said stationary element and adapted to engage the friction surface, an actuating rod, a two-element wedge acting to move the shoe into engagement with the friction surface, one element of which has a relatively high pitch and is yieldingly connected to said actuating means, the other element of which has a relatively low pitch and is rigidly connected to said actuating means, a follower engaging said high pitch element and yieldingly secured to the brake shoe and having a limited movement, and means connected to said follower to lock said high pitch element immovable upon the application of a predetermined force, whereby upon the application of a force in excess of said predetermined force the connection between the high pitch wedge element and the rod will yield and the low pitch wedge element will be moved to exert a high pressure between the shoe and the friction surface.

6. Braking apparatus comprising a moving element having a friction surface thereon, a stationary element, a shoe connected to the stationary element and adapted to engage the friction surface to retard the moving element, and means acting resiliently to move the shoe rapidly into engagement with the friction surface at small mechanical advantage, and thereafter acting positively upon the shoe to exert a relatively large mechanical advantage thereon.

7. Braking apparatus comprising a moving element having a friction surface thereon, a stationary element, a shoe connected to the stationary element and adapted to engage the friction surface to retard the moving element, a two-part shoe applying means acting to move the shoe into engagement with the friction surface, one of said parts acting alone after such engagement to effect the braking action, and means to lock one part against movement while the other acts.

8. Braking apparatus comprising a drum secured to a moving element and having an internal friction surface, a stationary element, a shoe within said drum connected to said stationary element and adapted to be expanded into engagement with said friction surface to retard the moving element, wedging means acting upon said shoe to give it a relatively rapid movement at small mechanical advantage until it engages said friction surface, and means actuated by the resistance offered by such engagement to change the mechanical advantage of said wedging means as it continues to act on said shoe and thereafter to exert a relatively large mechanical advantage upon the shoe.

EDWARD B. BELL.

CERTIFICATE OF CORRECTION.

Patent No. 1,942,044.  January 2, 1934.

EDWARD B. BELL.

It is hereby certified that error appears in the printed specification of the above numbered patent requiring correction as follows: Page 2, line 123, claim 1, for "weighing" read wedging; and that the said Letters Patent should be read with this correction therein that the same may conform to the record of the case in the Patent Office.

Signed and sealed this 6th day of March, A. D. 1934.

F. M. Hopkins (Seal)  Acting Commissioner of Patents.